(12) United States Patent
Lee

(10) Patent No.: US 11,464,058 B2
(45) Date of Patent: Oct. 4, 2022

(54) ELECTRONIC DEVICE AND COMMUNICATION METHOD OF TRANSMITTING AUDIO DATA TO EXTERNAL ELECTRONIC DEVICES

(71) Applicant: SAMSUNG ELECTRONICS CO., LTD., Suwon-si (KR)

(72) Inventor: Hyungyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 16/771,477

(22) PCT Filed: Jan. 9, 2019

(86) PCT No.: PCT/KR2019/000348
§ 371 (c)(1),
(2) Date: Jun. 10, 2020

(87) PCT Pub. No.: WO2019/143062
PCT Pub. Date: Jul. 25, 2019

(65) Prior Publication Data
US 2021/0185744 A1    Jun. 17, 2021

(30) Foreign Application Priority Data
Jan. 18, 2018  (KR) .................... 10-2018-0006792

(51) Int. Cl.
*H04W 76/14*  (2018.01)
*H04W 76/15*  (2018.01)
(Continued)

(52) U.S. Cl.
CPC .......... *H04W 76/14* (2018.02); *H01Q 1/2291* (2013.01); *H04B 1/0064* (2013.01);
(Continued)

(58) Field of Classification Search
CPC ..... H04W 76/14; H04W 76/15; H04W 80/02; H04W 88/06; H01Q 1/2291; H04B 7/0404; H04B 7/082; H04B 7/0417
See application file for complete search history.

(56) References Cited

U.S. PATENT DOCUMENTS 9,131,353 B2   9/2015  Qi et al.
9,277,008 B2   3/2016  Qi et al.
(Continued)

FOREIGN PATENT DOCUMENTS

KR       10-0456461 B1    11/2004
KR   10-2012-0124318 A    11/2012
(Continued)

OTHER PUBLICATIONS

International Search Report (PCT/ISA/210) dated Apr. 9, 2019 issued by the International Searching Authority in International Application No. PCT/KR2019/000348.
(Continued)

*Primary Examiner* — Ricky Q Ngo
*Assistant Examiner* — Stephen N Steiner
(74) *Attorney, Agent, or Firm* — Sughrue Mion, PLLC (57) ABSTRACT

An electronic device according to various embodiments of the disclosure includes an antenna module including a first antenna and a second antenna, a Wi-Fi module for communicating with an external electronic device using the antenna module, and a processor for controlling the Wi-Fi module.

15 Claims, 5 Drawing Sheets

(51) Int. Cl.
*H01Q 1/22* (2006.01)
*H04B 7/0404* (2017.01)
*H04B 7/08* (2006.01)
*H04W 80/02* (2009.01)
*H04W 88/06* (2009.01)
*H04B 1/00* (2006.01)
*H04B 7/0417* (2017.01)

(52) U.S. Cl.
CPC ........... *H04B 7/0404* (2013.01); *H04B 7/082* (2013.01); *H04W 76/15* (2018.02); *H04W 80/02* (2013.01); *H04W 88/06* (2013.01); *H04B 7/0417* (2013.01)

(56) References Cited

U.S. PATENT DOCUMENTS

| | | |
|---|---|---|
| 10,004,095 B2 | 6/2018 | Jung |
| 10,064,051 B2 | 8/2018 | Ingale et al. |
| 10,375,571 B2 | 8/2019 | Ingale et al. |
| 10,446,910 B2 | 10/2019 | Han et al. |
| 2014/0172141 A1* | 6/2014 | Mangold ................ H04B 11/00 700/94 |
| 2017/0163513 A1 | 6/2017 | Kim et al. |
| 2019/0075607 A1* | 3/2019 | Park ....................... H04W 92/18 |
| 2019/0141786 A1* | 5/2019 | Park ........................ H04W 4/80 |

FOREIGN PATENT DOCUMENTS

| | | |
|---|---|---|
| KR | 10-2015-0087318 A | 7/2015 |
| KR | 10-2018-0005471 A | 1/2016 |
| KR | 10-2017-0066115 A | 6/2017 |
| KR | 10-1751154 B1 | 6/2017 |
| KR | 10-2017-0098401 A | 8/2017 |
| WO | WO-2019005038 A1 * | 1/2019 ............ H04W 84/18 |

OTHER PUBLICATIONS

Written Opinion (PCT/ISA/237) dated Apr. 9, 2019 issued by the International Searching Authority in International Application No. PCT/KR2019/000348.

* cited by examiner

ELECTRONIC DEVICE AND COMMUNICATION METHOD OF TRANSMITTING AUDIO DATA TO EXTERNAL ELECTRONIC DEVICES

TECHNICAL FIELD

The disclosure relates to an electronic device for performing Wi-Fi communication.

BACKGROUND ART

With the development of electronic technology, various types of electronic products have been developed and distributed. Particularly, recently, the distribution of electronic devices such as smartphones, tablet PCs and TVs, which communicate with other electronic devices, has been expanded.

Various electronic devices may establish a network with each other to transmit and receive data and provide a user with various services. Particularly, recently, as Wi-Fi communication technology is developed, the electronic device may wirelessly access an Internet network via an access point (AP) or may perform P2P communication with other devices.

The Wi-Fi communication technology may be to perform multi input multi output (MIMO) communication over a plurality of channels using a plurality of antennas to communicate through a wider bandwidth.

DISCLOSURE

Technical Problem

An electronic device may be connected with an audio device which supports P2P communication while performing MIMO communication with an external electronic device. When the electronic device is connected with the audio device as well as the external electronic device at the same time, transmission of audio data to be transmitted to the audio data may be delayed according to a state where the electronic device communicates with the external electronic device. Because synchronization with image data output from the electronic device is varied when the transmission delay of the audio data occurs, it is uncomfortable for a user to view the image data.

Various embodiments of the disclosure are to provide an electronic device capable of stably transmitting audio data and a communication method of the electronic device.

Technical Solution

In accordance with an aspect of the disclosure, an electronic device is provided. The electronic device may include an antenna module configured to include a first antenna and a second antenna, a Wi-Fi module configured to communicate with an external electronic device using the antenna module, and a processor configured to control the Wi-Fi module, The processor may be configured to communicate with a first external electronic device using at least one of the first antenna and the second antenna, determine whether a second external electronic device is an audio device, when a connection with the second external electronic device is detected, and communicate with the second external electronic device using the second antenna, when it is determined that the second external electronic device is the audio device.

In accordance with another aspect of the disclosure, a communication method of an electronic device is provided. The communication method may include communicating with a first external electronic device using at least one of a first antenna and a second antenna, determining whether a second external electronic device is an audio device, when a connection with the second external electronic device is detected, and communicating with the second external electronic device using the second antenna, when it is determined that the second external electronic device is the audio device.

In accordance with another aspect of the disclosure, a computer-readable storage medium is provided. The computer-readable storage medium may store a program for performing a method including communicating with a first external electronic device using at least one of a first antenna and a second antenna, determining whether a second external electronic device is an audio device, when a connection with the second external electronic device is detected, and communicating with the second external electronic device using the second antenna, when it is determined that the second external electronic device is the audio device.

Advantageous Effects

According to various embodiments of the disclosure, the electronic device may stably transmit data which is small in size, real-time transmission of which is important, when connected with a plurality of external electronic devices to communicate.

MODE FOR INVENTION

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure. With regard to description of drawings, similar denotations may be used for similar components.

The expression "at least one of A and B" may be used in an embodiment describing the disclosure and should be interpreted as the meaning including "only A", "only B", or "both of A and B". Likewise, the expression "at least one of A, B, and C" may be used and should be interpreted as meaning "only A", "only B", "only C", "both of A and B", "both of A and C", "both of B and C", or "all of A, B, and C".

Figure 1:
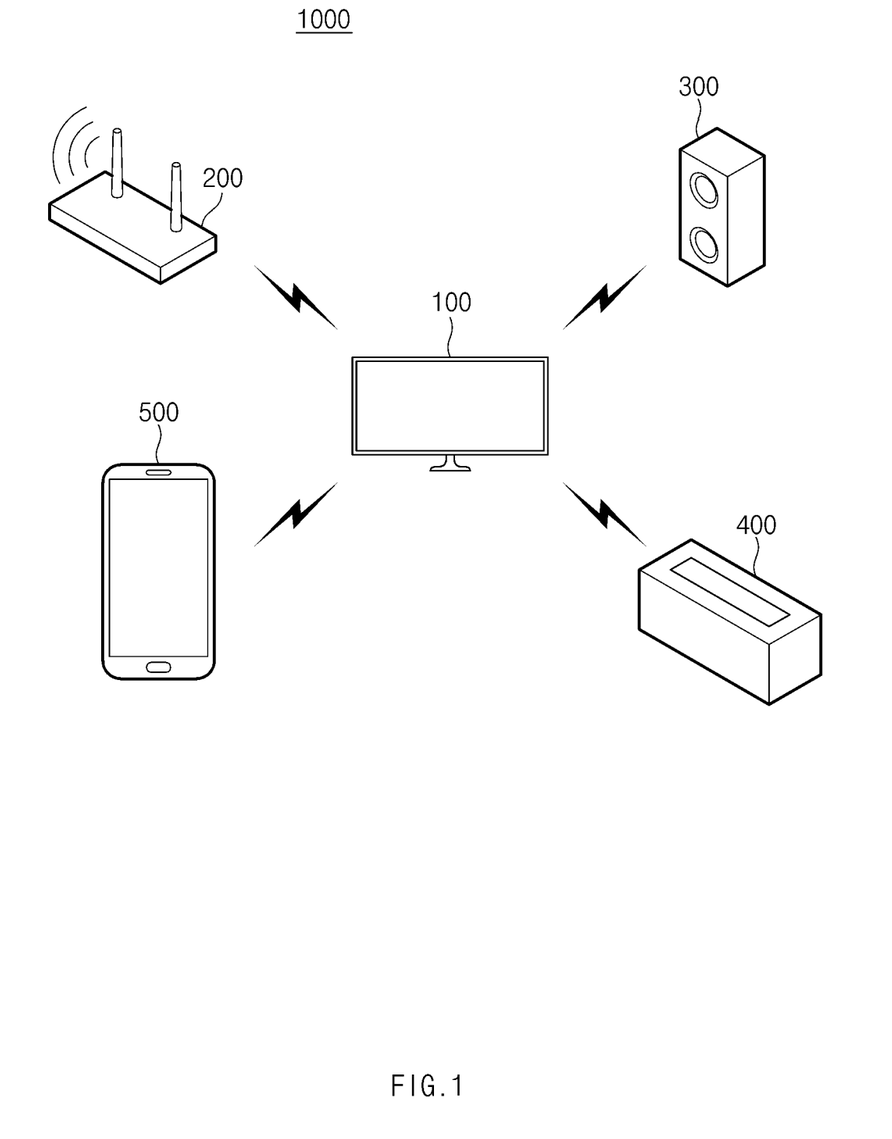
FIG. 1 is a drawing illustrating a communication system according to various embodiments of the disclosure.

FIG. 1 is a drawing illustrating a communication system according to various embodiments of the disclosure.

Referring to FIG. 1, a communication system 1000 may include a plurality of electronic devices 100, 200, 300, 400, and 500.

According to an embodiment, the first electronic device 100 may communicate with the second electronic device 200, the third electronic device 300, the fourth electronic device 400, and the fifth electronic device 500. For example, the first electronic device 100 may perform Wi-Fi communication with the second electronic device 200, the third electronic device 300, the fourth electronic device 400, and the fifth electronic device 500. According to an embodiment, the first electronic device 100 may be a user terminal capable of communicating with another electronic device such as a smart TV, a smartphone, or a laptop.

According to an embodiment, the second electronic device 200 may be an access point (AP). According to an embodiment, the second electronic device 200 may perform Wi-Fi (wireless LAN) communication with the first electronic device 100 and/or the fifth electronic device 500 to connect the first electronic device 100 and/or the fifth electronic device 500 with an Internet network.

According to an embodiment, the third electronic device 300 and the fourth electronic device 400 may be peer to peer (P2P) devices which perform P2P communication. According to an embodiment, the first electronic device 100 may perform Wi-Fi direct communication with the third electronic device 300 and the fourth electronic device 400. According to an embodiment, the third electronic device 300 and the fourth electronic device 400 may be audio devices. For example, the third electronic device 300 and the fourth electronic device 400 may output an audio signal received from the first electronic device 100 or may transmit an audio signal to the first electronic device 100.

According to an embodiment, the fifth electronic device 500 may communicate with the first electronic device 100 and the second electronic device 200. For example, the first device 500 may perform P2P communication with the first electronic device 100. For another example, the fifth device 500 may perform Wi-Fi communication with the second electronic device 200 to connect with the Internet network. According to an embodiment, the fifth electronic device 500 may be a user terminal capable of communicating with another electronic device such as a smart TV, a smartphone, or a laptop.

According to an embodiment, the first electronic device 100 may perform multi input multi output (MIMO) communication with the second electronic device 200 over a plurality of channels using a plurality of antennas. For example, the first electronic device 100 may communicate with the second electronic device 200 over the channel of the 5 GHz frequency band and the channel of the 2.4 GHz frequency band. Because the available bandwidth becomes wider when performing MIMO communication with the second electronic device 200, the first electronic device 100 may ensure stable network quality.

According to an embodiment, while performing MIMO communication with the second electronic device 200, the first electronic device 100 may be connected with one of the third electronic device 300, the fourth electronic device 400, or the fifth electronic device 500. For example, the first device 100 may transmit/receive data via the second electronic device 200. At the same time, image data may be output on a display and audio data may be transmitted to the third electronic device 300. The third electronic device 300 may output the audio data. When the first electronic device 100 is connected with the second electronic device 200 and the third electronic device 300 at the same time, transmission of audio data to be transmitted to the third electronic device 300 may be delayed according to a state where the first electronic device 100 communicates with the second electronic device 200. Because synchronization with image data output from the first electronic device 100 is varied when the transmission delay of the audio data occurs, it may be uncomfortable for a user to view the image data. Thus, for audio data which is small in size, real-time transmission of which is important, the first electronic device 100 may set one of a plurality of antennas as a dedicated antenna for transmitting the audio data to stable transmit the audio data.

Figure 2:
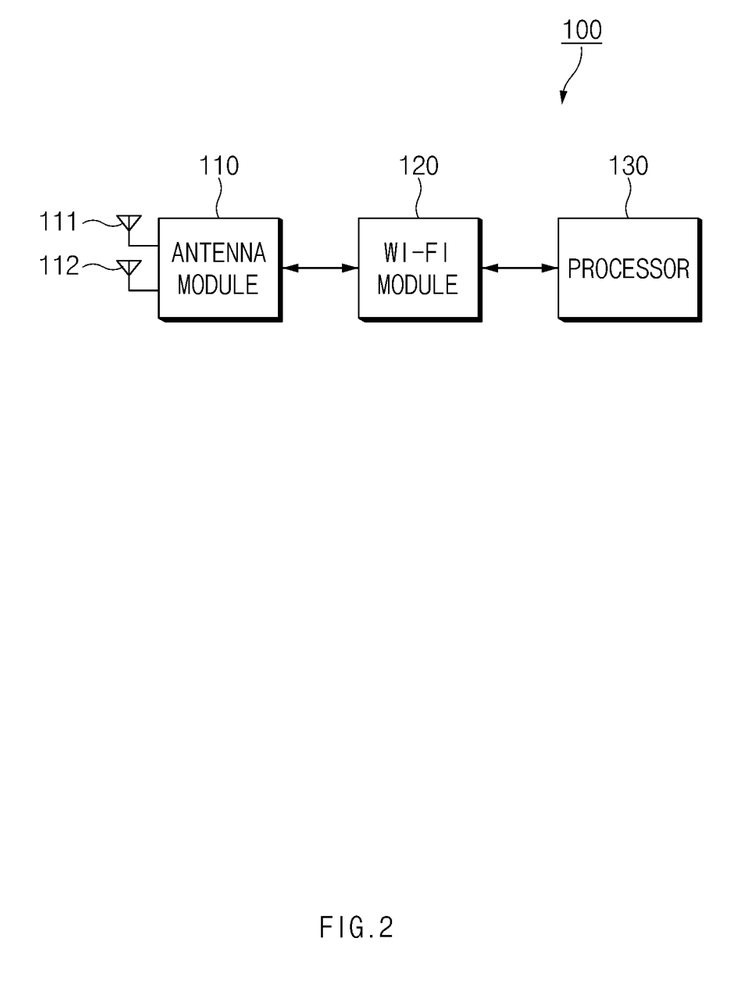
FIG. 2 is a block diagram illustrating a configuration of an electronic device according to various embodiments of the disclosure.

FIG. 2 is a block diagram illustrating a configuration of an electronic device according to various embodiments of the disclosure.

Referring to FIG. 2, an electronic device (e.g., a first electronic device 100) may include an antenna module 110, a Wi-Fi module 120, and a processor 130.

According to an embodiment, the antenna module 110 may transmit and receive a signal with an external electronic device (e.g., a second electronic device 200, a third electronic device 300, a fourth electronic device 400, and a fifth electronic device 500). According to an embodiment, the antenna module 110 may include a plurality of antennas 111 and 112. For example, the antenna module 110 may include the first antenna 111 and the second antenna 112. According to an embodiment, each of the plurality of antennas 111 and 112 may be a multi-band antenna. For example, each of the plurality of antennas 111 and 112 may transmit and receive a signal at the same time in the 5 GHz frequency band and the 2.4 GHz frequency band.

According to an embodiment, the Wi-Fi module 120 may perform Wi-Fi communication with the external electronic device using the antenna module 110. For example, the Wi-Fi module 120 may transmit and receive data according to the Wi-Fi specification using the antenna module 110.

According to an embodiment of the disclosure, the antenna module 110 and the Wi-Fi module 120 may be configured on separate chips or may be disposed on a communication module configured as a single integrated chip.

According to an embodiment, the processor 130 may control an overall operation of the first electronic device 100. For example, the processor 130 may control the Wi-Fi module 120 to communicate with the external electronic device according to various embodiments of the disclosure.

According to an embodiment, the first electronic device 100 may include at least one (e.g., a plurality of) processor(s) 130. According to an embodiment, the processor 130 may be implemented as a system on chip (SoC) including a central processing unit (CPU), a graphic processing unit (GPU), a memory, or the like. According to an embodiment, the processor 130 may be included in the Wi-Fi module 120 to be implemented as one chip or module with the Wi-Fi module 120.

According to an embodiment, the processor 130 may perform Wi-Fi communication with a first external electronic device (e.g., the second electronic device 200) using at least one of the first antenna 111 and the second antenna 112. According to an embodiment, the processor 130 may communicate with the first external electronic device over a plurality of channels. For example, the processor 130 may communicate over a channel of a first frequency band (e.g., 5 GHz) using the first antenna 111 and may communicate over a channel of a second frequency band (e.g., 2.4 GHz) using the second antenna 112.

According to an embodiment, the processor 130 may be connected with a second external electronic device (e.g., the third electronic device 300 or the fourth electronic device 400) via the Wi-Fi module 120 in a state where the processor 130 communicates with the first external electronic device via the Wi-Fi module 120. According to an embodiment, the second external electronic device may be a P2P device which performs P2P communication (e.g., Wi-Fi direct).

According to an embodiment, when the processor 130 is connected with the second external electronic device (or when the connection is detected) via the Wi-Fi module 120, the processor 130 may identify (or determine) whether the second external electronic device is an audio device. The audio device may refer to a device, for example a speaker, a mixer, or an amplifier, which processes or outputs an audio signal or transmits and receives the audio signal.

According to an embodiment, when connected with the second external electronic device via the Wi-Fi module 120, the processor 130 may receive identification information of the second external electronic device from the second external electronic device. For example, the processor 130 may receive information such as a product name, a serial number, or a manufacturer of the second external electronic device from the second external electronic device. According to an embodiment, the processor 130 may identify whether the second external electronic device is an audio device based on device identification information received from the second external electronic device.

According to an embodiment, the processor 130 may receive device identification information of the second external electronic device via another wireless communication module (e.g., a Bluetooth module or a near field communication (NFC) module) before being connected with the second external electronic device via the Wi-Fi module 120 and may identify whether the second external electronic device is an audio device based on the received device identification information. For example, the second external electronic device may broadcast device identification information in a Bluetooth low energy (BLE) advertise mode, and the processor 130 may identify whether the second external electronic device is an audio device based on the device identification information received through the Bluetooth module.

According to an embodiment, when connected with the second external electronic device via the Wi-Fi module 120, the processor 130 may identify a protocol of a signal received from the second external electronic device. According to an embodiment, the processor 130 may identify whether the second external electronic device is an audio device based on the protocol of the signal received from the second external electronic device. For example, when the protocol of the signal received from the second external electronic device is a protocol supporting transmission of audio data, the processor 130 may determine that the second external electronic device is the audio device.

According to an embodiment, when the second external electronic device is the audio device (or is determined as the audio device), the processor 130 may communicate with the second external electronic device using the second antenna 112. For example, the processor 130 may change the second antenna 112 to a dedicated antenna for communication with the second external electronic device, may communicate with the first external electronic device using the first antenna 111, and may communicate with the second external electronic device using the second antenna 112. The processor 130 may communicate with the first external electronic device in the first frequency band (e.g., 5 GHz) using the first antenna 111 and may communicate with the second external electronic device in the second frequency band (e.g., 2.4 GHz) using the second antenna 112.

According to an embodiment, when the second external electronic device is not the audio device, the processor 130 may communicate with the first external electronic device and the second external electronic device using the second antenna 112. For example, the processor 130 may communicate with the first external electronic device using the first antenna 111 and may alternately communicate with the first external electronic device and the second external electronic device in a time division scheme using the second antenna 112.

According to an embodiment, when the second external electronic device is connected, the processor 130 may identify a network state and a quality of service (QoS) parameter of communication of the second external electronic device. The QoS parameter may include, for example, a bandwidth, a transmission rate (or throughput), a delay time, a packet loss rate, or the like. According to an embodiment, the processor 130 may identify whether the network state meets the QoS parameter.

According to an embodiment, when the network state does not meet the QoS parameter, the processor 130 may communicate with the second external electronic device using the second antenna 112. For example, the processor 130 may change the second antenna 112 to a dedicated antenna for communication with the second external electronic device, may communicate with the first external electronic device using the first antenna 111, and may communicate with the second external electronic device using the second antenna 112. The processor 130 may communicate with the first external electronic device in the first frequency band (e.g., 5 GHz) using the first antenna 111 and may communicate with the second external electronic device in the second frequency band (e.g., 2.4 GHz) using the second antenna 112.

According to an embodiment, when the network state meets the QoS parameter, the processor 130 may communicate with the first external electronic and the second external electronic device using the second antenna 112. For example, the processor 130 may communicate with the first external electronic device using the first antenna 111 and may alternately communicate with the first external electronic device and the second external electronic device in a time division scheme using the second antenna 112.

According to an embodiment, the processor 130 may be connected with a third external electronic device (e.g., the fifth electronic device 500) via the Wi-Fi module 120 in a state where the processor 130 communicates with the first external electronic device and the second external electronic device via the Wi-Fi module 120. According to an embodiment, the third external electronic device may be a P2P device which performs P2P communication.

According to an embodiment, when connected with the third external electronic device (or when the connection is detected) via the Wi-Fi module 120, the processor 130 may identify (or determine) whether the third external electronic device is an audio device. According to an embodiment, the processor 130 may identify whether the third external electronic device is an audio device in the same manner as the second external electronic device.

According to an embodiment, when the third external electronic device is the audio device (or is determined as the audio device), the processor 130 may communicate with the third external electronic device using the second antenna 112. For example, the processor 130 may change the second antenna 112 to a dedicated antenna for communication with the third external electronic device, may communicate with the first external electronic device using the first antenna 111, and may communicate with the second external electronic device and the third external electronic device in a time division scheme using the second antenna 112. The processor 130 may communicate with the first external electronic device in the first frequency band (e.g., 5 GHz) using the first antenna 111 and may communicate with the second external electronic device and the third external electronic device in the second frequency band (e.g., 2.4 GHz) using the second antenna 112.

According to an embodiment, when the third external electronic device is not the audio device, the processor 130 may communicate with the first external electronic device, the second external electronic device, and the third external electronic device using the second antenna 112. For example, the processor 130 may communicate with the first external electronic device using the first antenna 111 and may alternately communicate with the first external electronic device, the second external electronic device, and the third external electronic device in a time division scheme using the second antenna 112.

Figure 3:
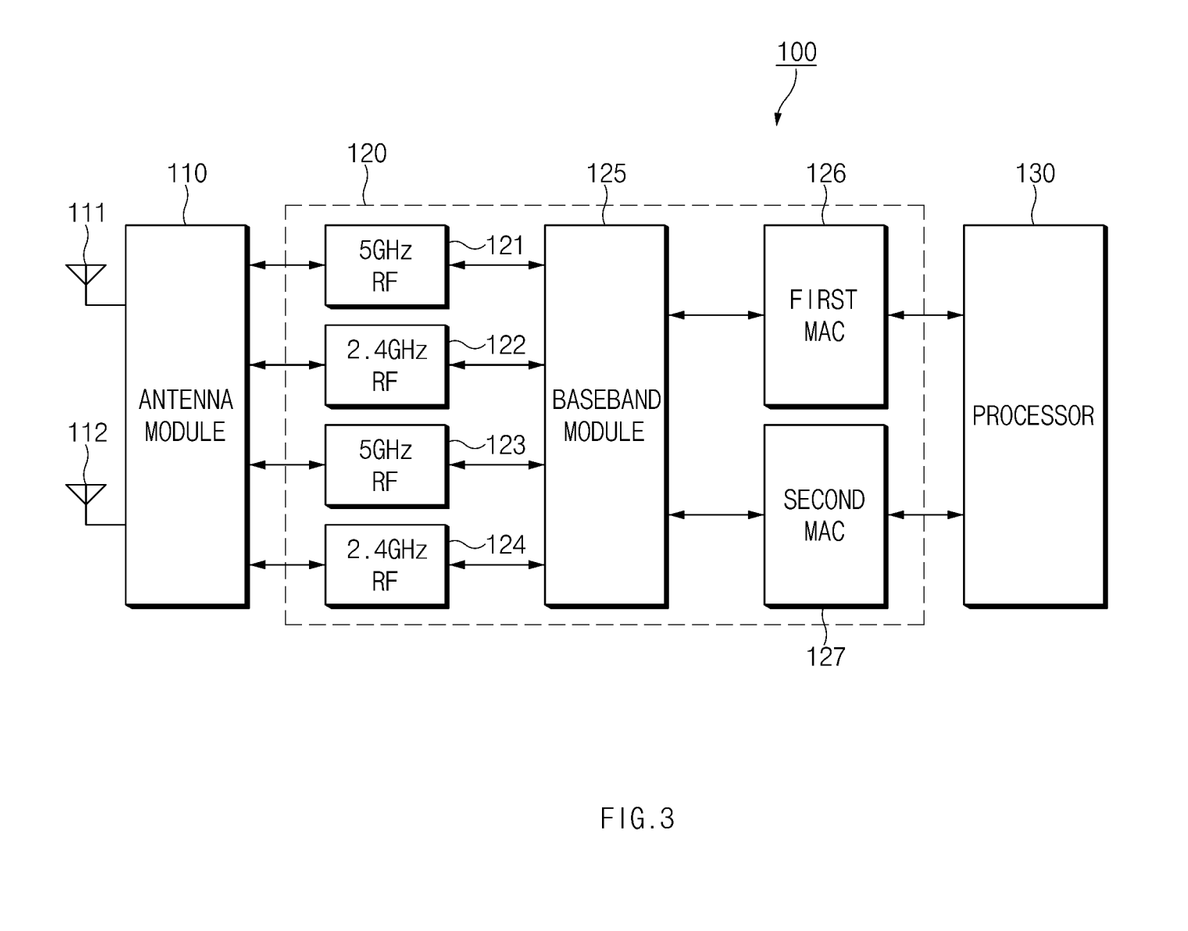
FIG. 3 is a block diagram illustrating a detailed configuration of a Wi-Fi module.

FIG. 3 is a block diagram illustrating a detailed configuration of a Wi-Fi module.

Referring to FIG. 3, a Wi-Fi module 120 may include a plurality of RF modules 121, 122, 123, and 124, a baseband module 125, and a plurality of MAC modules 126 and 127.

The plurality of RF modules 121, 122, 123, and 124 may decrease and deliver a frequency of a signal received from a plurality of antennas 111 and 112 to the baseband module 125 or may increase and transmit a frequency of a signal received from the baseband module 125 to a specified frequency (or 5 GHz or 2.4 GHz) via the plurality of antennas 111 and 112.

According to an embodiment, the baseband module 125 and the MAC modules 126 and 127 may process a signal depending on the Wi-Fi specification. The baseband module 125 may process and deliver a signal received from the MAC modules 126 and 127 to the RF modules 121, 122, 123, and 124 or may process and deliver a signal received from the RF modules 121, 122, 123, and 124 to the MAC modules 126 and 127. The MAC modules 126 and 127 may process and deliver a signal received from the processor 130 to the baseband module 125 or may process and deliver a signal received from the baseband module 125 to the processor 130.

According to an embodiment, when a second external electronic device is an audio device (or is determined as the audio device) the processor 130 may set one (e.g., the second MAC module 127) of the plurality of MAC modules 126 and 127 to a dedicated MAC module for communication with the second external electronic device. The processor 130 may communicate with a first external electronic device using the first MAC module 126 and may communicate with the second external electronic device using the second MAC module 127. For example, the processor 130 may communicate with the first external electronic device in a first frequency band (e.g., 5 GHz) using the first MAC module 126 and may communicate with the second external electronic device in a second frequency band (e.g., 2.4 GHz) using the second MAC module 127.

Figure 4:
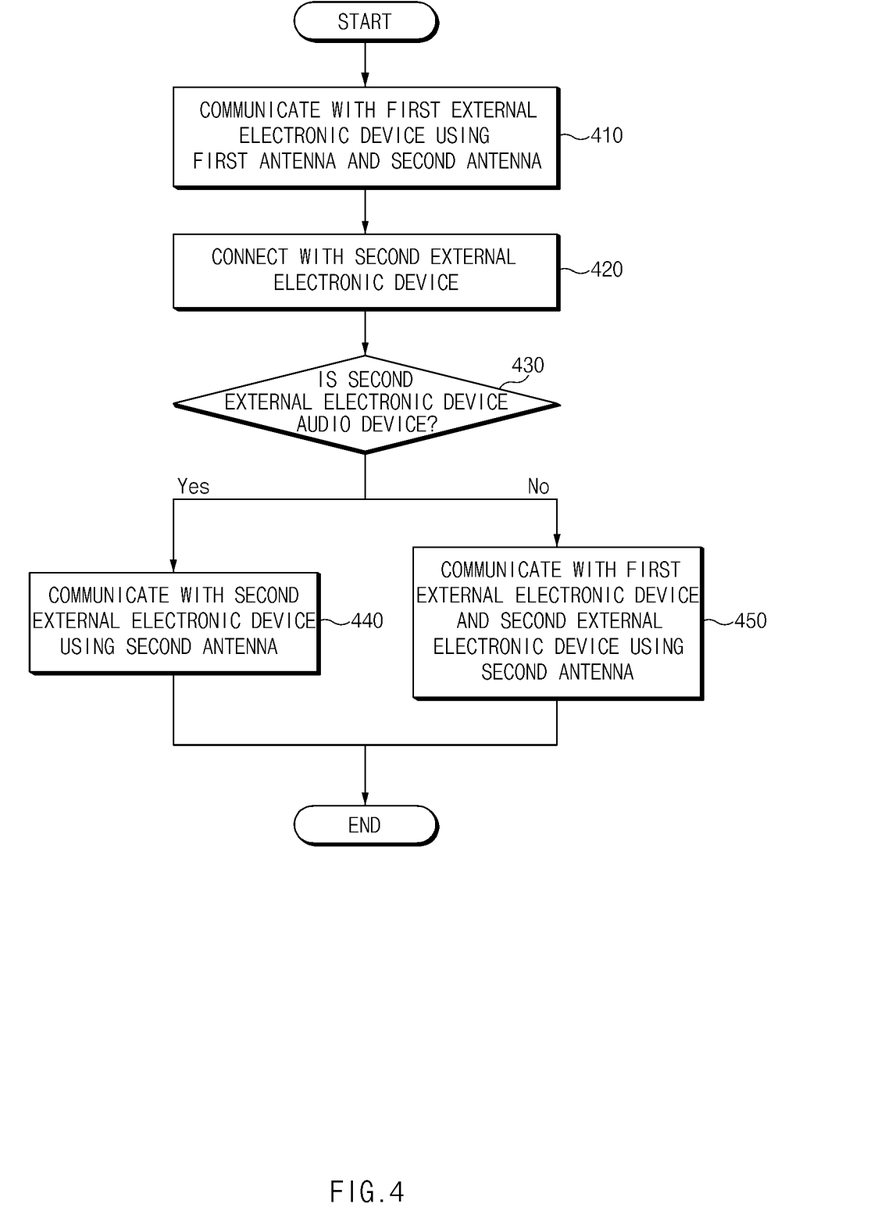
FIG. 4 is a flowchart illustrating a communication method of an electronic device according to various embodiments of the disclosure.

FIG. 4 is a flowchart illustrating a communication method of an electronic device according to various embodiments of the disclosure.

The flowchart shown in FIG. 4 may be configured with operations processed by the above-mentioned electronic device (e.g., an electronic device 100 of FIG. 2). Thus, contents described in FIGS. 1 to 3 are applicable to the flowchart shown in FIG. 4.

According to an embodiment, in operation 410, the electronic device 100 may communicate with a first external electronic device using a first antenna and a second antenna. For example, the electronic device 100 may perform Wi-Fi communication. According to an embodiment, a processor 130 may communicate with the first external electronic device over a plurality of channels. For example, the electronic device 100 may communicate over a channel of a first frequency band (e.g., 5 GHz) using the first antenna and may communicate over a channel of a second frequency band (e.g., 2.4 GHz) using the second antenna.

According to an embodiment, in operation 420, the electronic device 100 may be connected with a second external electronic device. For example, the electronic device 100 may be connected with the second external electronic device via a Wi-Fi module in a state where it communicates with the first external electronic device via the Wi-Fi module. According to an embodiment, the second external electronic device may be a P2P device which performs P2P communication (e.g., Wi-Fi direct).

According to an embodiment, in operation 430, the electronic device 100 may identify (or determine) whether the second external electronic device is an audio device. For example, when connected with the second external device via the Wi-Fi module, the electronic device 100 may receive identification information of the second external electronic device from the second external electronic device and may identify whether the second external electronic device is the audio device based on the received device identification information. According to an embodiment, the electronic device 100 may receive device identification information of the second external electronic device via another wireless communication module (e.g., a Bluetooth module or a near field communication (NFC) module) before being connected with the second external electronic device via the Wi-Fi module and may identify whether the second external electronic device is the audio device based on the received device identification information. For another example, when connected with the second external electronic device via the Wi-Fi module, the electronic device 100 may identify a protocol of a signal received from the second external electronic device and may identify whether the second external electronic device is the audio device based on the protocol of the signal received from the second external electronic device.

According to an embodiment, when the second external electronic device is the audio device, in operation 440, the electronic device 100 may communicate with the second external electronic device using the second antenna. For example, electronic device 100 may change the second antenna to a dedicated antenna for communication with the second external electronic device, may communicate with the first external electronic device using the first antenna, and may communicate with the second external electronic device using the second antenna. The electronic device 100 may communicate with the first external electronic device in the first frequency band (e.g., 5 GHz) using the first antenna and may communicate with the second external electronic device in second frequency band (e.g., 2.4 GHz) using the second antenna.

According to an embodiment, when the second external electronic device is not the audio device, in operation 450, the electronic device 100 may communicate with the first external electronic device and the second external electronic device using the second antenna. For example, electronic device 100 may communicate with the first external electronic device using the first antenna and may alternately communicate with the first external electronic device and the second external electronic device in a time division scheme using the second antenna.

According to an embodiment, the processor 100 may be connected with a new device (e.g., a third electronic device) via the Wi-Fi module in a state where it communicates with the first external electronic device and the second external electronic device via the Wi-Fi module. According to an embodiment, when a new electronic device is connected (or when the connection with the new electronic device is detected), the electronic device 100 may repeatedly perform operations 420 to 450.

Figure 5:
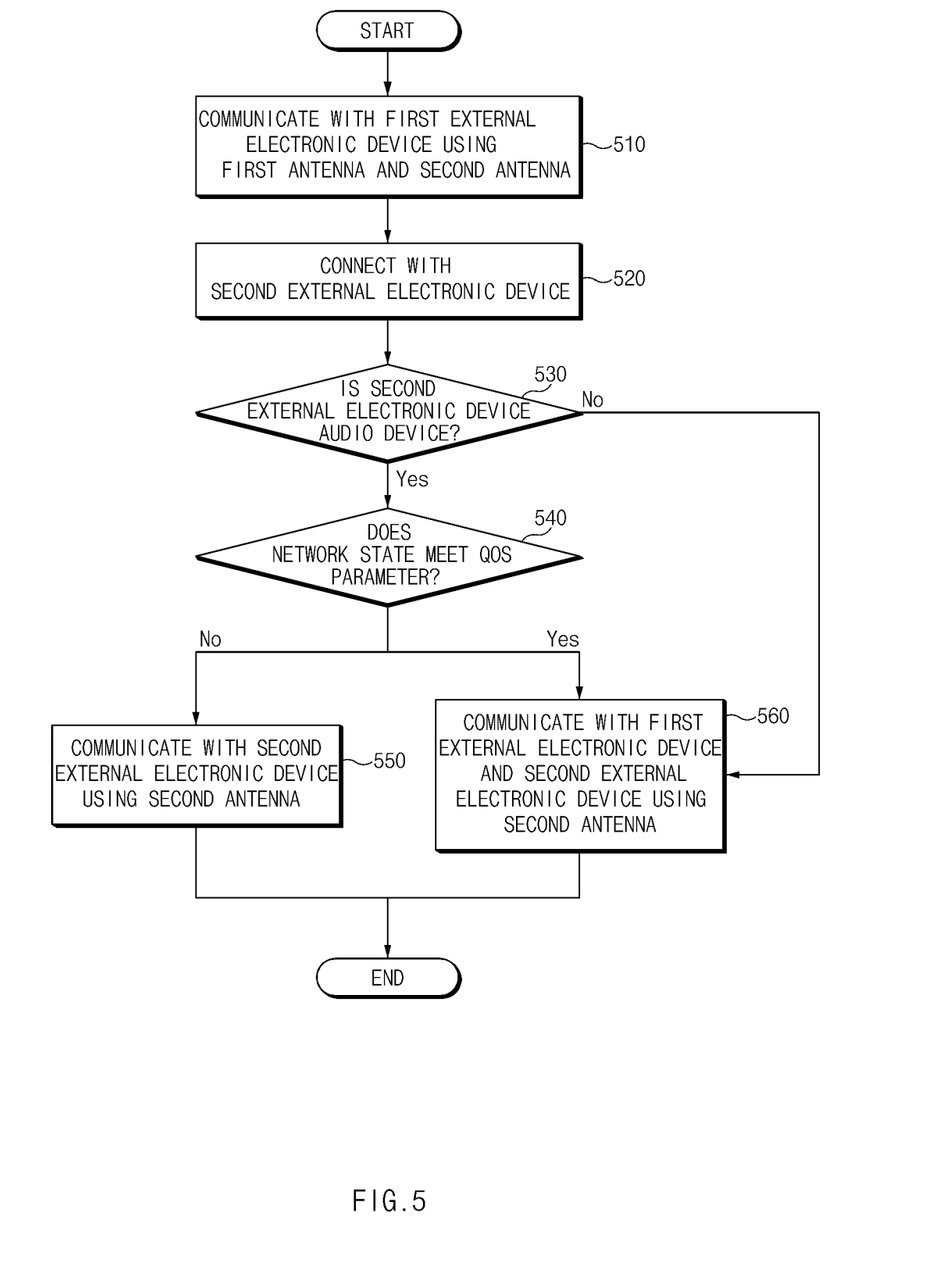
FIG. 5 is a flowchart illustrating a communication method of an electronic device according to various embodiments of the disclosure.

FIG. 5 is a flowchart illustrating a communication method of an electronic device according to various embodiments of the disclosure.

The flowchart shown in FIG. 5 may be configured with operations processed by the above-mentioned electronic device (e.g., an electronic device 100 of FIG. 2). Contents described in FIGS. 1 to 3 are applicable to the flowchart shown in FIG. 5.

According to an embodiment, in operation 510, the electronic device 100 may communicate with a first external electronic device using a first antenna and a second antenna. For example, the electronic device 100 may perform Wi-Fi communication. According to an embodiment, a processor 130 may communicate with the first external electronic device over a plurality of channels. For example, the electronic device 100 may communicate over a channel of a first frequency band (e.g., 5 GHz) using the first antenna and may communicate over a channel of a second frequency band (e.g., 2.4 GHz) using the second antenna.

According to an embodiment, in operation 520, the electronic device 100 may be connected with a second external electronic device. For example, the electronic device 100 may be connected with the second external electronic device via a Wi-Fi module in a state where it communicates with the first external electronic device via the Wi-Fi module. According to an embodiment, the second external electronic device may be a P2P device which performs P2P communication (e.g., Wi-Fi direct).

According to an embodiment, in operation 530, the electronic device 100 may identify (or determine) whether the second external electronic device is an audio device. For example, when connected with the second external device via the Wi-Fi module, the electronic device 100 may receive identification information of the second external electronic device from the second external electronic device and may identify whether the second external electronic device is the audio device based on the received device identification information. According to an embodiment, the electronic device 100 may receive device identification information of the second external electronic device via another wireless communication module (e.g., a Bluetooth module or a near field communication (NFC) module) before being connected with the second external electronic device via the Wi-Fi module and may identify whether the second external electronic device is the audio device based on the received device identification information. For another example, when connected with the second external electronic device via the Wi-Fi module, the electronic device 100 may identify a protocol of a signal received from the second external electronic device and may identify whether the second external electronic device is the audio device based on the protocol of the signal received from the second external electronic device.

According to an embodiment, when the second external electronic device is not the audio device, in operation 450, the electronic device 100 may communicate with the first external electronic device and the second external electronic device using the second antenna. For example, electronic device 100 may communicate with the first external electronic device using the first antenna and may alternately communicate with the first external electronic device and the second external electronic device in a time division scheme using the second antenna.

According to an embodiment, when the second external electronic device is the audio device (or is determined as the audio device), in operation 540, the electronic device 100 may identify whether a network state meets a QoS parameter. The QoS parameter may include, for example, a bandwidth, a transmission rate (or throughput), a delay time, a packet loss rate, or the like.

According to an embodiment, when the network state does not meet the QoS parameter, in operation 440, the electronic device 100 may communicate with the second external electronic device using the second antenna. For example, electronic device 100 may change the second antenna to a dedicated antenna for communication with the second external electronic device, may communicate with the first external electronic device using the first antenna, and may communicate with the second external electronic device using the second antenna. The electronic device 100 may communicate with the first external electronic device in the first frequency band (e.g., 5 GHz) using the first antenna and may communicate with the second external electronic device in second frequency band (e.g., 2.4 GHz) using the second antenna.

According to an embodiment, when the network state meets the QoS parameter, in operation 450, the electronic device 100 may communicate with the first external electronic and the second external electronic device using the second antenna. For example, electronic device 100 may communicate with the first external electronic device using the first antenna and may alternately communicate with the first external electronic device and the second external electronic device in a time division scheme using the second antenna.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction. The computer-readable storage medium may include a hard disk, a floppy disk, a magnetic medium (e.g., a magnetic tape), an optical medium (e.g., a CD-ROM or a DVD), a magneto-optical medium (e.g., a floptical disk), an internal memory, or the like. The instructions may contain a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising:
an antenna module configured to include a first antenna and a second antenna;
a Wi-Fi module configured to communicate with an external electronic device using the antenna module; and
a processor configured to control the Wi-Fi module,
wherein the processor is configured to:
communicate with a first external electronic device using the first antenna and the second antenna;
determine whether a second external electronic device is an audio device, when the electronic device is connected with the second external electronic device in a state where the electronic device communicates with the first external electronic device using the first antenna and the second antenna;
when it is determined that the second external electronic device is not the audio device, control the Wi-Fi module to alternately communicate with the first external electronic device and the second external electronic device using the second antenna, while the electronic device communicates with the first external electronic device using the first antenna; and
when it is determined that the second external electronic device is the audio device, control the Wi-Fi module to communicate with the second external electronic device using the second antenna, while the electronic device communicates with the first external electronic device using the first antenna.

2. The electronic device of claim 1, wherein the processor is configured to:
communicate with the first external electronic device in a first frequency band using the first antenna and communicate with the second external electronic device in a second frequency band using the second antenna, when it is determined that the second external electronic device is the audio device.

3. The electronic device of claim 1, wherein the processor is configured to:
identify whether the second external electronic device is the audio device based on identification information of the second external electronic device, the identification information being received according to a connection with the second external electronic device.

4. The electronic device of claim 1, wherein the processor is configured to:
identify a protocol of a signal received from the second external electronic device and identify whether the second external electronic device is the audio device based on the identified protocol.

5. The electronic device of claim 1, wherein the processor is configured to:
perform peer to peer (P2P) communication with the second external electronic device.

6. The electronic device of claim 1, wherein the Wi-Fi module includes:
a first media access controller (MAC) and a second MAC, and
wherein the processor is configured to:
communicate with the first external electronic device using the first MAC and communicate with the second external electronic device using the second MAC, when it is determined that the second external electronic device is the audio device.

7. The electronic device of claim 1, wherein the processor is configured to:
identify a network state and a quality of service (QoS) parameter of communication of the second external electronic device, when the electronic device is connected with the second external electronic device;
communicate with the second external electronic device using the second antenna, when the network state does not meet the QoS parameter; and
communicate with the first external electronic device and the second external electronic device using the second antenna, when the network state meets the QoS parameter.

8. The electronic device of claim 1, wherein the processor is configured to:
identify whether a third external electronic device is the audio device, when a connection with the third external electronic device is detected;
communicate with the third external electronic device using the second antenna, when it is determined that the third external electronic device is the audio device; and
communicate with the third external electronic device using the first antenna, when the third external electronic device is not the audio device.

9. A Wi-Fi communication method of an electronic device, the method comprising:
communicating with a first external electronic device a first antenna and a second antenna;
determining whether a second external electronic device is an audio device, when the electronic device is connected with the second external electronic device in a state where the electronic device communicates with the first external electronic device using the first antenna and the second antenna;
when it is determined that the second external electronic device is not the audio device, alternately communicating with the first external electronic device and the second external electronic device using the second antenna, while the electronic device communicates with the first external electronic device using the first antenna; and
when it is determined that the second external electronic device is the audio device, communicating with the second external electronic device using the second antenna, while the electronic device communicates with the first external electronic device using the first antenna.

10. The method of claim 9, further comprising, when it is determined that the second external electronic device is the audio device:
communicating with the first external electronic device in a first frequency band using the first antenna; and
communicating with the second external electronic device in a second frequency band using the second antenna.

11. The method of claim 9, wherein the determining of whether the second external electronic device is the audio device includes:
receiving device identification information of the second external electronic device from the second external electronic device; and
identifying whether the second external electronic device is the audio device based on the device identification information.

12. The method of claim 9, wherein the determining of whether the second external electronic device is the audio device includes:
   identifying a protocol of a signal received from the second external electronic device; and
   identifying whether the second external electronic device is the audio device based on the identified protocol.

13. The method of claim 9, further comprising, when it is determined that the second external electronic device is the audio device, performing peer to peer (P2P) communication with the second external electronic device.

14. The method of claim 9, further comprising, when it is determined that the second external electronic device is the audio device:
   communicating with the first external electronic device using a first media access controller (MAC); and
   communicating with the second external electronic device using a second MAC.

15. The method of claim 9, further comprising:
   identifying a current network state and a quality of service (QoS) parameter of communication of the second external electronic device, when the second external electronic device is connected;
   communicating with the second external electronic device using the second antenna, when the current network state does not meet the QoS parameter; and
   communicating with the first external electronic device and the second external electronic device using the second antenna, when the current network state meets the QoS parameter.

* * * * *